United States Patent
David et al.

(10) Patent No.: US 12,175,118 B2
(45) Date of Patent: Dec. 24, 2024

(54) EXTERNAL NONVOLATILE MEMORY WITH ADDITIONAL FUNCTIONALITY

(71) Applicant: Silicon Laboratories Inc., Austin, TX (US)

(72) Inventors: Thomas Saroshan David, Lakeway, TX (US); Aslam Rafi, Austin, TX (US); Joshua Norem, Austin, TX (US); Adrianus Josephus Bink, Oslo (NO); Daniel Cooley, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 29 days.

(21) Appl. No.: 17/700,906

(22) Filed: Mar. 22, 2022

(65) Prior Publication Data

US 2023/0305737 A1    Sep. 28, 2023

(51) Int. Cl.
*G06F 3/06* (2006.01)

(52) U.S. Cl.
CPC .......... *G06F 3/0655* (2013.01); *G06F 3/0613* (2013.01); *G06F 3/0622* (2013.01); *G06F 3/0679* (2013.01)

(58) Field of Classification Search
CPC .... G06F 3/0655; G06F 3/0613; G06F 3/0622; G06F 3/0679
USPC .......................................................... 710/74
See application file for complete search history.

(56) References Cited

U.S. PATENT DOCUMENTS

| | | | | |
|---|---|---|---|---|
| 6,754,802 B1* | 6/2004 | Kirsch | ................ | G06F 15/7821 712/18 |
| 6,775,328 B1* | 8/2004 | Segaram | ................. | H04L 25/14 710/61 |
| 9,692,448 B1* | 6/2017 | Kong | ...................... | H03M 9/00 |
| 10,360,970 B1* | 7/2019 | Chang | ................. | G11C 7/1057 |
| 10,637,472 B1* | 4/2020 | Mitra | ............. | H03K 19/018528 |
| 10,733,048 B1* | 8/2020 | Avron | ................. | G06F 11/1012 |
| 10,819,303 B1* | 10/2020 | Park | ........................ | H01L 25/18 |
| 10,972,108 B1* | 4/2021 | Li | ......................... | H03L 7/0812 |
| 11,768,794 B1* | 9/2023 | Rafi | ..................... | G06F 13/4068 710/105 |
| 2003/0112031 A1* | 6/2003 | Agrawal | .......... | H03K 19/17744 326/41 |
| 2008/0077718 A1* | 3/2008 | Kn | ...................... | G06F 13/4095 710/10 |

(Continued)

FOREIGN PATENT DOCUMENTS

EP    3842976 A1    6/2021

*Primary Examiner* — Christopher B Shin
(74) *Attorney, Agent, or Firm* — NIELDS, LEMACK & FRAME, LLC (57) ABSTRACT

An external nonvolatile memory device that includes a rewritable nonvolatile memory and a CMOS interface is disclosed. The interface includes a clock signal which is input to the external nonvolatile memory device. This clock signal is multiplied by an integer to create a memory serdes clock which is used to clock outgoing data. The memory serdes clock is also used to create a clock that is used to clock the incoming data from the main processing device. The external nonvolatile memory device also includes an encryption/decryption block that encrypts data read from the nonvolatile memory before it is transmitted over the interface, and decrypts data received from the interface before storing it in the nonvolatile memory. The encryption/decryption block may utilize a stream cipher.

20 Claims, 5 Drawing Sheets

(56) References Cited

U.S. PATENT DOCUMENTS

| | | | | |
|---|---|---|---|---|
| 2010/0045395 | A1* | 2/2010 | Fu | G06F 1/08 |
| | | | | 331/179 |
| 2011/0040909 | A1* | 2/2011 | Abdulla | G11C 7/1075 |
| | | | | 710/71 |
| 2011/0239031 | A1* | 9/2011 | Ware | G06F 13/1689 |
| | | | | 713/500 |
| 2011/0317793 | A1* | 12/2011 | Katz | G06F 1/10 |
| | | | | 375/371 |
| 2012/0137139 | A1* | 5/2012 | Kudoh | H04L 9/10 |
| | | | | 713/189 |
| 2013/0313709 | A1* | 11/2013 | Hinck | H04B 1/40 |
| | | | | 257/738 |
| 2014/0108628 | A1* | 4/2014 | Ananthiah | H03K 19/17704 |
| | | | | 709/222 |
| 2018/0088848 | A1* | 3/2018 | Lee | G06F 13/4282 |
| 2018/0211694 | A1* | 7/2018 | Kim | G06F 13/1694 |
| 2019/0043551 | A1* | 2/2019 | Shaeffer | G11C 11/4096 |
| 2019/0122007 | A1* | 4/2019 | Van Antwerpen | G06F 21/602 |
| 2019/0293755 | A1* | 9/2019 | Cohen | G01S 7/295 |
| 2020/0051603 | A1* | 2/2020 | Kitagawa | G11C 7/1096 |
| 2020/0326890 | A1* | 10/2020 | Benisty | G06F 3/0673 |
| 2021/0004495 | A1* | 1/2021 | Osugi | H04L 9/0618 |
| 2022/0291863 | A1* | 9/2022 | Bae | G06F 1/06 |
| 2022/0350762 | A1* | 11/2022 | Park | G06F 13/1689 |
| 2023/0026320 | A1* | 1/2023 | Kim | G11C 11/4093 |

\* cited by examiner

EXTERNAL NONVOLATILE MEMORY WITH ADDITIONAL FUNCTIONALITY

FIELD

This disclosure describes systems for maximizing CPU performance using an external nonvolatile memory.

BACKGROUND

System on Chip (SoC) and other similar devices are created by disposing a processing unit, its instructions and other functions within a single die. In some cases, the processing unit may be an ARM-based processor, although other processors may be used. Further, in some embodiments, the instructions are disposed within a rewritable nonvolatile memory (NVM), such as a FLASH memory.

However, the scaling of NVM has lagged transistor scaling. For example, transistor scaling has reached 22 nm and is projected to shrink to smaller geometries. In contrast, NVM technology is currently limited to 40 nm or larger geometries. This leaves system designers with a dilemma. The SoC may be manufactured using an older technology to allow the incorporation of FLASH memory. However, this approach limits the number of transistors in the device and also results in higher power consumption.

Alternatively, the SoC may be made using the most recent technology. In this embodiment, the designer may opt to use a ROM based architecture, which does not allow upgrades of the software at a later date. Alternatively, newer NVM technologies, such as ReRAM or MRAM, may be utilized. However, these memory technologies are not yet mature. Yet another alternative is to utilize external nonvolatile memory.

Existing external nonvolatile memories utilize a Serial Peripheral Interface (SPI) interface. Unfortunately, these memories have slow access times. For example, it may take over 64 CPU cycles to fill a 4-word cache line at single data rate (SDR). Furthermore, the interface to these external nonvolatile memories operates at 1.8V, which consumes power.

Further, there is no security associated with these external nonvolatile memories. This may allow a hacker or other bad actor to monitor or inject code into the processing unit.

Therefore, it would be beneficial if there was a configuration that allowed field upgradable code, utilized current fabrication technology, was secure and consumed little power.

SUMMARY

An external nonvolatile memory device that includes a rewritable nonvolatile memory and a CMOS interface is disclosed. The interface includes a clock signal which is input to the external nonvolatile memory device. This clock signal is multiplied by an integer to create a memory serdes clock which is used to clock outgoing data. The memory serdes clock is also used to create a clock that is used to clock the incoming data from the main processing device. The external nonvolatile memory device also includes an encryption/decryption block that encrypts data read from the nonvolatile memory before it is transmitted over the interface, and decrypts data received from the interface before storing it in the nonvolatile memory. The encryption/decryption block may utilize a stream cipher.

According to one embodiment, an external nonvolatile memory device is disclosed. The external nonvolatile memory device comprises a rewritable nonvolatile memory; and an interface, wherein the interface comprises a bidirectional data signal; and a clock input, wherein the clock input is used to create a memory serdes clock that is used to clock outgoing data being transmitted on the bidirectional data signal. In certain embodiments, the clock input is multiplied by an integer to create the memory serdes clock. In some embodiments, the integer is 2. In some embodiments, the clock input has a frequency greater than 1 GHz. In some embodiments, the data is transmitted at a rate of greater than 2 Gbits/sec. In some embodiments, the clock input is held in a deasserted state if no data is being transmitting on the bidirectional data signal. In some embodiments, the external nonvolatile memory device comprises an encryption/decryption block to encrypt data read from the rewritable nonvolatile memory before the data is transmitted over the interface. In certain embodiments, the encryption/decryption block utilizes a stream cipher. In some embodiments, the external nonvolatile memory device comprises circuitry to append a cyclic redundancy code (CRC) to the data being transmitted over the interface. In some embodiments, encryption/decryption block decrypts data received on the interface before writing the data to the rewritable nonvolatile memory. In certain embodiments, the bidirectional data signal utilizes CMOS signaling. In some embodiments, the external nonvolatile memory device supports secure boot.

In another embodiment, a system is disclosed. The system comprises the external nonvolatile memory device described above and a main processing device, wherein the main processing device comprises the bidirectional data signal; an outgoing clock signal; and a radio circuit, configured to transmit and receive packets at a RF frequency, wherein a frequency of the outgoing clock signal is selected such that the frequency or a harmonic thereof is within 10% of the RF frequency.

In another embodiment, an external nonvolatile memory device is disclosed. The external nonvolatile memory device comprises a rewritable nonvolatile memory; an interface, wherein the interface comprises a bidirectional data signal; an interrupt signal; and a clock input; and an encryption/decryption block to encrypt data read from the rewritable nonvolatile memory before the data is transmitted over the interface. In certain embodiments, the encryption/decryption block utilizes a stream cipher. In some embodiments, the external nonvolatile memory device comprises circuitry to append a cyclic redundancy code (CRC) to the data being transmitted over the interface. In some embodiments, encryption/decryption block decrypts data received on the interface before writing the data to the rewritable nonvolatile memory. In some embodiments, the interrupt signal is asserted when an error is detected by the encryption/decryption block. In some embodiments, the external nonvolatile memory device comprises a processing unit, wherein the interrupt signal is asserted when processing unit wishes to provide information to a device connected to the interface. In some embodiments, if the interrupt signal is asserted by a different device, the external nonvolatile memory device resets.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
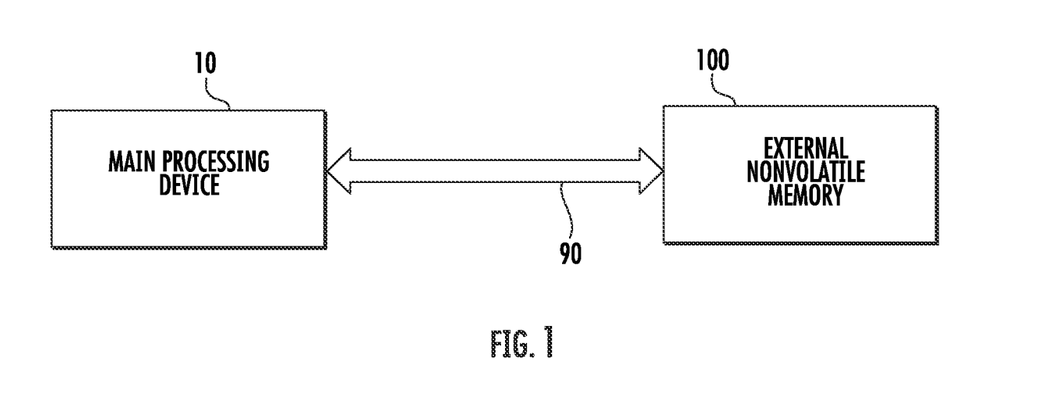
FIG. 1 shows a main processing device and an associated external nonvolatile memory device.

FIG. 1 shows a block diagram with a main processing device 10 and an associated external nonvolatile memory device 100. The main processing device 10 may include an embedded processing unit and a cache memory. In certain embodiments, the main processing device 10 may be fabricated using 22 nm technology. In some embodiments, a smaller geometry may be used. This choice allows a maximum number of transistors, while minimizing power consumption.

The external nonvolatile memory device 100 may be fabricated using an older technology, such as 40 nm or 90 nm. These technologies are better adapted to rewritable nonvolatile memories, such as FLASH memories.

Additionally, an interface 90, also referred to as the serdes interface, may be used to communicate between the two devices. The interface 90 may include one or more data signals. Additionally, the interface 90 may include a clock signal. The use of a clock signal enables higher speed communication between the devices, as clock reconstruction is not required. The interface 90 may utilize single-ended CMOS signals, which consume less power than LVDS signals. In certain embodiments, the voltage used for the signals in the interface 90 may be less than 2V. In some embodiments, the voltage may be less than 1V.

In addition to the data signals and a clock signal, the interface 90 may comprises other signals as well. For example, in certain embodiments, the main processing device 10 may supply the power to the external nonvolatile memory device 100. In this way, the external nonvolatile memory device 100 may take advantage of the DC-to-DC converter resident in the main processing device 10. In certain embodiments, the interface 90 may include a reset signal. In certain embodiments, the interface 90 may include an interrupt (IRQ) signal.

Figure 2:
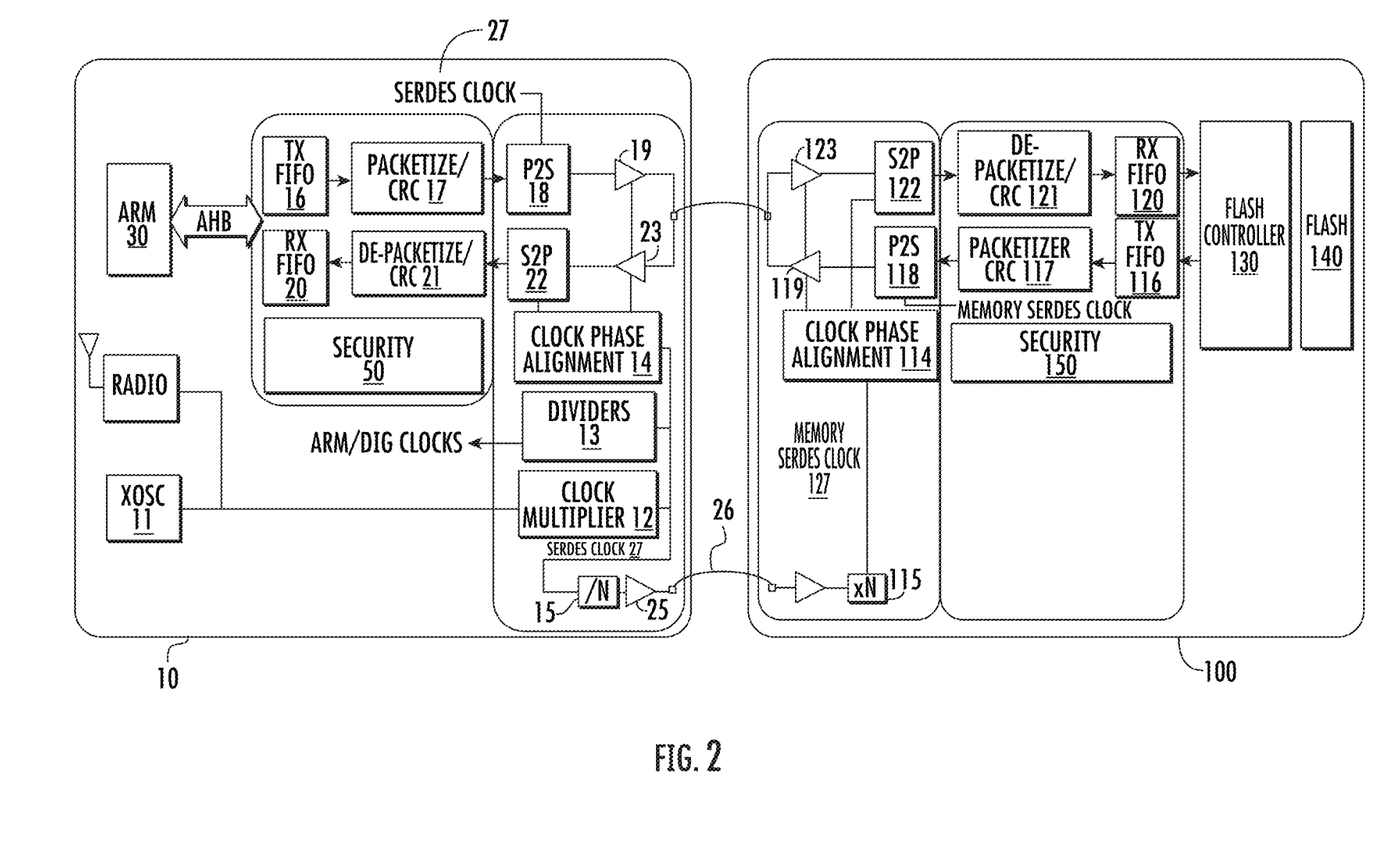
FIG. 2 is a block diagram of the interface between the main processing device and the associated external nonvolatile memory device.

FIG. 2 shows a block diagram of the interface between the main processing device 10 and the external nonvolatile memory device 100. Each block within the main processing device 10 and within the external nonvolatile memory device 100 may be an integrated circuit comprising a plurality of transistors configured to perform the described operation or function. Further, as noted above, the nonvolatile memory is rewritable.

The main processing device 10 includes an external oscillator 11, which may be a crystal. This external oscillator 11 is in communication with a clock multiplier 12, which multiplies the clock signal from the external oscillator 11 to obtain higher frequency signals. One output of the clock multiplier 12, referred to as the serdes clock, may be in excess of 2 GHz, such as 2.4 GHz or more. The serdes clock may then be provided as an input to the clock divider 13, which divides the high frequency clock for use within other blocks of the main processing device 10, such as generating the clock for the processing unit 30, which may be an ARM processor.

The serdes clock determines the data rate of the interface 90. For example, if the serdes clock 27 has a frequency of 2.5 GHz, then data can be transmitted at a rate of up to 2.5 Gbits/sec. In certain embodiments, the serdes clock is greater than 2 GHz, so the data is transmitted at a rate of greater than 2 Gbits/sec.

The serdes clock is also provided to a divider 15, which divides the high frequency clock by an integer (N). This reduction in frequency of the serdes clock reduces the power consumption of clock driver 25. In some embodiments, N may be 2. The reduced frequency clock 26 is then transmitted to the external nonvolatile memory device 100 using clock driver 25. The reduced frequency clock 26 may have a frequency greater than 1 GHz.

The serdes clock is also provided to a clock phase alignment block 14. This block is used to align the phase of the clock used by the serial-to-parallel (S2P) converter 22 to the incoming data from the external nonvolatile memory device 100.

The main processing device 10 also includes an incoming and outgoing data path.

The outgoing data path comprises a transmit FIFO 16, and a packetizer 17 to create packets from the data that is to be transmitted. The packets may contain commands, data and other control information. The output of the packetizer 17 is then provided to a parallel-to-serial (P2S) converter 18. The P2S converter 18 may be clocked using the serdes clock. The output from the P2S converter 18, which is a serial bit stream, is then provided to the data output buffer 19.

The incoming data path comprises a data input buffer 23. The output from the data input buffer 23 is provided to a serial-to-parallel (S2P) converter 22. The S2P converter 22 is clocked by the output of the clock phase alignment block 14, which centers each incoming data bit about a rising clock edge. The output of the S2P converter 22, which is parallel data, is used by the depacketizer 21 to extract the necessary information from the incoming data, which is in the form of a packet. The output of the depacketizer 21 is then provided to the receive FIFO 20.

The external nonvolatile memory device 100 is configured to interface with the main processing device 10. As such, it comprises a multiplier 115, which receives the reduced frequency clock 26 transmitted by clock driver 25. The multiplier 115 multiplies the received clock by the same factor which it was divided by in the divider 15. In this way, the output of the multiplier 115, which is referred to as the memory serdes clock 127, is the same frequency as the serdes clock 27.

The external nonvolatile memory device 100 also includes an incoming and outgoing data path.

The outgoing data path comprises a transmit FIFO 116, and a packetizer 117 to create packets from the data that is to be transmitted. The output of the packetizer 117 is then provided to a parallel-to-serial (P2S) converter 118. The P2S converter 118 may be clocked using the memory serdes clock 127. The output from the P2S converter 118 is then provided to the data output buffer 119.

The incoming data path comprises a data input buffer 123. The output from the data input buffer 123 is provided to a serial-to-parallel (S2P) converter 122. The S2P converter 122 is clocked by the output of the clock phase alignment module 114, which centers the incoming data bit about the rising clock edge. Specifically, the clock phase alignment block receives the memory serdes clock 127 as an input and generates a clock having the same frequency as the memory serdes clock 127, but with a different phase that is aligned to the incoming data. The output of the S2P converter 122 is used by the depacketizer 121 to extract the necessary information from the incoming data. The output of the depacketizer 121 is then provided to the receive FIFO 120.

The transmit and receive FIFOs are in communication with a nonvolatile memory (NVM) controller 130, which is responsible for providing addresses to the nonvolatile memory 140, which may be a FLASH memory or other rewritable nonvolatile memory. The data is stored in the nonvolatile memory 140.

Additionally, security and error correction may be included in the data paths. For example, the packetizers may include circuitry to append a cyclic redundancy code (CRC) to the packet prior to transmission. Similarly, the depacketizers may utilize circuitry that uses the CRC that was appended by the packetizers to validate that there are no data transmission errors.

Further, additional security features may be incorporated into the main processing device 10 and the external nonvolatile memory device 100. For example, a security module 50 may be incorporated into the main processing device 10 and a security module 150 may also be incorporated into the external nonvolatile memory device 100. In certain embodiments, the security modules may be used to encrypt the data that is being transmitted. For example, a Galois/Counter Mode (GCM) algorithm may be used to encrypt the data. Of course, other algorithms may also be used. While the security modules are shown as separate blocks, it is understood that these modules interact with the respective incoming and outgoing data paths.

Further, as described in more detail below, the security modules may also allow for secure boot.

In certain embodiments, there may be separate external connections for the outgoing data (i.e. data transmitted from the main processing device 10 to the external nonvolatile memory device 100) and for the incoming data (i.e. data transmitted from the external nonvolatile memory device 100 to the main processing device 10). Thus, in this mode, there are two (or more) unidirectional data signals between the main processing device 10 and the external nonvolatile memory device 100. Further, in this mode, the output of the data output buffer 19 is not connected to the input of the data input buffer 23, and the output of the data output buffer 119 is not connected to the input of the data input buffer 123.

In other embodiments, such as that shown in FIG. 2, to minimize external connections, the data signal may be bidirectional, operating in half-duplex mode. In this embodiment, the output of the data output buffer 19 and the input of the data input buffer 23 are connected to a single external connection. Similarly, the output of the data output buffer 119 and the input of the data input buffer 123 are connected to a single external connection. Further, these two external connections are connected using a trace disposed on the printed circuit board.

Half-duplex communications are configured such that all communications are initiated by the main processing device 10. In other words, the external nonvolatile memory device 100 never initiates a communication with the main processing device 10. Rather, it only responds to communications initiated by the main processing device 10.

Figure 3:
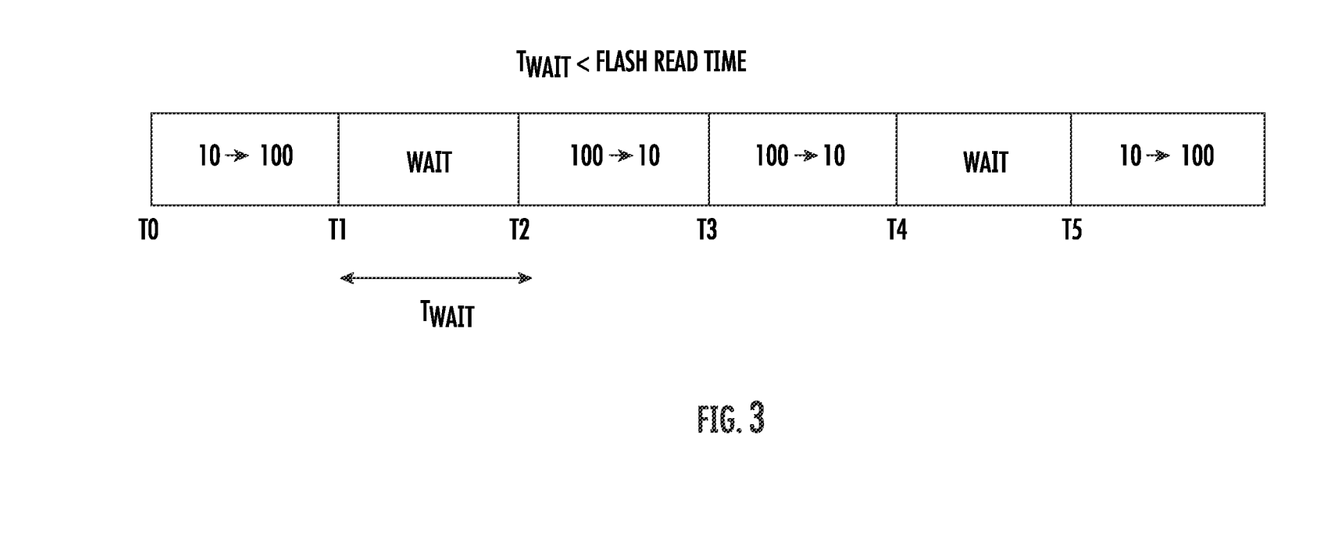
FIG. 3 shows a timing diagram showing the operation of the interface.

As an example, FIG. 3 shows a series of communications between the main processing device 10 and the external nonvolatile memory device 100. At time T0, the main processing device 10 initiates a communication by sending a packet to the external nonvolatile memory device 100. This packet may be a command to read several locations starting at a specified address. Since the main processing device 10 initiates all communications, it does not need to sense the data signal or wait before starting the transmission of the packet at time T0. After transmission of the packet, both devices recognize that the response requires the external nonvolatile memory device 100 to transmit data back to the main processing device 10. In response, at time T1, the main processing device 10 turns off its data output buffer 19 and enables the data input buffer 23. Similarly, the external nonvolatile memory device 100 enables its data output buffer 119 and disables its data input buffer 123. This process may take some duration of time, represented as $T_{wait}$. Note that the duration $T_{wait}$ is less than the time needed to read the contents of the FLASH memory, so there is no penalty incurred by introducing this wait time. At time T2, the external nonvolatile memory device 100 transmits a first packet. That packet may contain data contained in the specified address in FLASH. If, at time T3, the external nonvolatile memory device 100 needs to transmit a second packet, such as to transmit more data from the FLASH, it simply begins transmission. No wait is required, since the previous packet was also transmitted from the external nonvolatile memory device 100 to the main processing device 10. At time T4, the transmission of the second packet has been completed. Before, the main processing device 10 may transmit another packet at time T5, a wait period must be inserted to allow the data buffers to be reconfigured.

In certain embodiments, the main processing device 10 may drive all outputs in the interface 90 to the low state when there is no activity between the two devices. In certain embodiments, this includes the clock signal.

Figure 4:
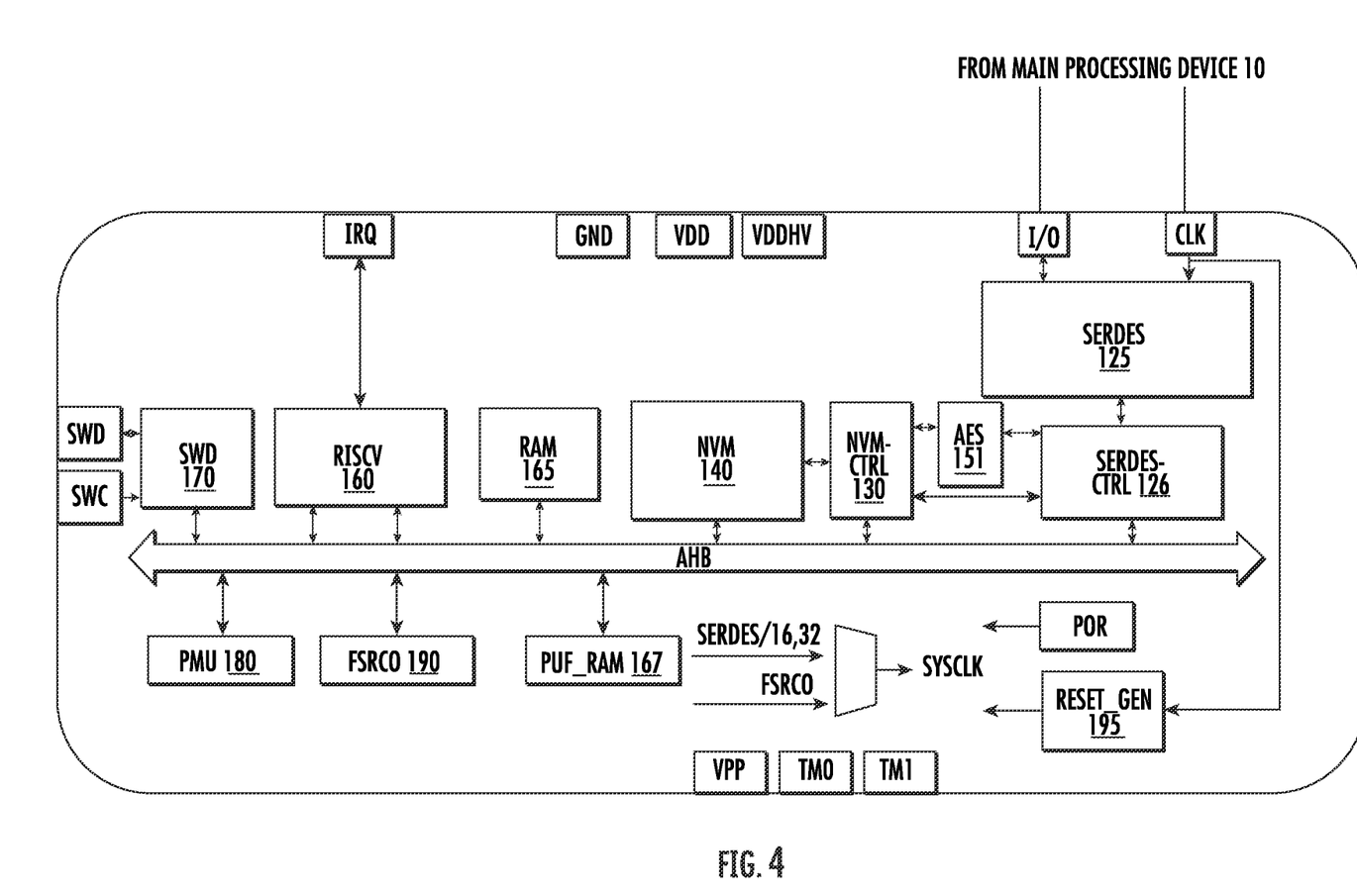
FIG. 4 is a block diagram of the external nonvolatile memory device.

FIG. 4 shows a block diagram of the external nonvolatile memory device 100.

The serdes module 125 and the serdes controller 126 contain the logic to manage the transition from serial data sent on the external interface, and parallel data used by the nonvolatile memory 140. As such, the serdes module 125 and the serdes controller 126 include many of the components described in FIG. 2, such as the data input buffer 123, the S2P converter 122, the depacketizer 121, the receive FIFO 120, the transmit FIFO 116, the packetizer 117, the P2S converter 118, the data output buffer 119, the clock phase alignment module 114, and the multiplier 115. These blocks function as described above. Further, the serdes module 125 and serdes controller 126 may also create a clock signal based on the memory serdes clock 127. For example, the memory serdes clock 127 may be divided by a number, such as 8, 16 or 32, to create an internal clock.

As described above, the security module 150 may be used to encrypt the data that is transmitted to the main processing device 10. Part of the security module 150 may include an encryption/decryption block 151. The encryption/decryption block 151 may utilize a known algorithm, such as AES or another algorithm, such as a stream cipher. The encryption/decryption block 151 is used to encrypt data that is read from the NVM 140 before it is transmitted on the interface 90. The encryption/decryption block 151 is also used to decrypt data that is received from the main processing device 10 before it is written to the NVM 140.

The NVM controller 130 is used to control access to the nonvolatile memory 140. The NVM controller 130 includes the state machine that reads and writes the nonvolatile memory 140. For example, a FLASH write is a multi-cycle process, taking many milliseconds with asynchronous timing of various signals to the nonvolatile memory 140. The control of these various signals is controlled by the NVM controller 130.

In addition to the functions that are used for data transfers, the external nonvolatile memory device 100 includes other blocks as well. For example, the external nonvolatile memory device 100 comprises a processing unit 160, which may be a RISC-V processor. A random-access memory (RAM) 165 may be used to contain information used by the processing unit 160. This processing unit 160 performs various functions.

The processing unit 160 may be responsible for the handling updates to the nonvolatile memory 140. For example, the processing unit 160 may be responsible for executing instructions that supply the data to the nonvolatile memory 140 using the required timing. This may be in support of write or erase operations that are performed on the nonvolatile memory 140.

In addition, the processing unit 160 may be used to alert the main processing device 10 of any unexpected events. For example, the processing unit 160 may assert the interrupt (IRQ) signal if an error is detected in the security module 150. Additionally, the interrupt (IRQ) signal may be asserted when the processing unit 160 wishes to provide data or status to the main processing device 10. Further, in certain embodiments, the interrupt (IRQ) signal is used by the main processing device 10 to reset the external nonvolatile memory device 100. In other words, when the interrupt signal is driven low, but not by the external nonvolatile memory device 100, the external nonvolatile memory device 100 will assume that the main processing device 10 asserted the signal. In response to an assertion of the interrupt (IRQ) signal by a different device, the external nonvolatile memory device 100 may reset.

The processing unit 160 will support some of the security functions provided as well as respond to error conditions and handle them in software. The processing unit 160 will also be used during bootup to support the initial configuration of the device and security operations such as secure boot. The processing unit 160 will also be used to support the power management unit (PMU) 180 while switching energy states.

The external nonvolatile memory device 100 also includes a special RAM which is used for secure boot. This special RAM may be referred to as Physical Unclonable Function (PUF) RAM 167. The purpose of the PUF RAM 167 is to generate a device unique key that cannot be easily replicated or extracted. With respect to this disclosure, it is important to note that the PUF RAM 167 exists to support storage of keys necessary to support link security, which is the encryption of the communications to and from the main processing device 10.

The external nonvolatile memory device 100 also includes a serial wire debug (SWD) block 170, and the associated interfaces required for this function. Serial Wire Debug blocks are well known and will not be described in detail.

The external nonvolatile memory device 100 also includes a power management unit (PMU) 180. The PMU 180 is responsible for enabling and disabling the supply of voltage to the various blocks within the device. For example, in low power modes, the PMU 180 may power off the entire device, with the exception of the PMU 180, the serdes controller 126 and optionally, the RAM 165.

The external nonvolatile memory device 100 also includes an oscillator 190. The oscillator 190 may be a RC oscillator. The oscillator 190 is used to generate the clock signal used by the processing unit 160 and other functions. As noted above, in certain embodiments, the clock signal in the interface 90 is disabled when there is no activity between the two devices. At these times, the external nonvolatile memory device 100 may utilize the output of the oscillator 190 so that it may continue operating. In certain embodiments, the external nonvolatile memory device 100 may select either the output from the oscillator or the internal clock generated by the serdes module 125.

The external nonvolatile memory device 100 may also include a reset generator 195. In certain embodiments, the main processing device 10 may assert the clock signal for a specific duration. If the clock signal is asserted for this duration, it indicates that the main processing device 10 wishes to reset the external nonvolatile memory device 100. Thus, the reset generator 195 is in communication with the clock signal from the interface 90 and asserts the reset signal as appropriate.

The present system has many advantages. First, by separating the nonvolatile memory from the processor, each may be fabricated using the technology that is best suited for that technology. For example, the processing unit and associated logic may be fabricated in a 22 nm (or smaller) process, while the nonvolatile memory device may be fabricated using a larger geometry, such as 40 nm or 90 nm.

Second, the present system incorporates a high speed interface, operating at up to 2.5 GHz. This allows data to be transmitted from the nonvolatile memory to the main processing device 10 very quickly, minimizing latency and maximizing throughput. This speed supports execution in place (XIP), meaning that the contents of the nonvolatile memory do not need to be replicated in their entirety in the main processing device 10. Rather, the cache in the main processing device 10 is sufficiently large to allow the processing unit 30 to operate at full speed while new data is being retrieved from the external nonvolatile memory.

Further, this interface is designed using CMOS signaling to save quiescent power. Many other components utilize an LVDS interface, which has much higher quiescent power. To further reduce the power consumed by the interface, the clock that is used by the interface is divided before being transmitted to the external nonvolatile memory device 100. This reduces the power consumed by the clock output buffer. So as an example, the data may be transmitted at 2.5 Gbits/sec, but the clock that is transmitted to the external nonvolatile memory device 100 may be 1.25 GHz or less.

Figure 5:
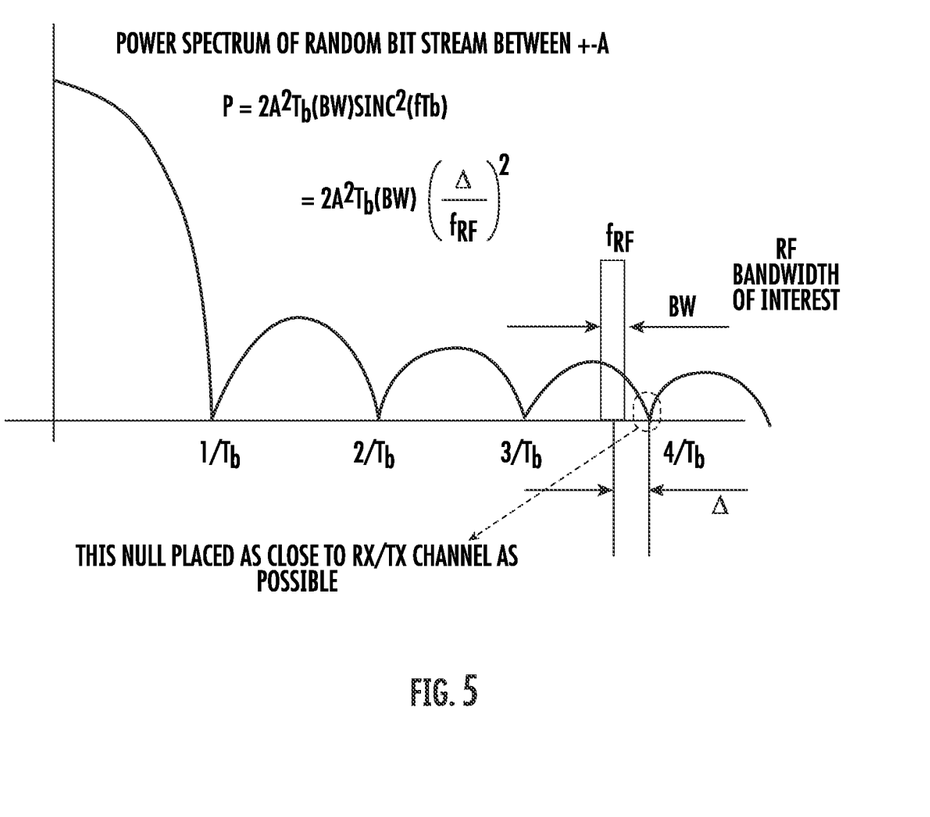
FIG. 5 shows the power spectrum of a random data pattern as compared to the wireless channel frequency.

Additionally, in certain embodiments, the frequency of the interface 90 may be controlled so as to minimize the interference between this interface and the wireless transceiver. FIG. 5 shows a power spectrum of the interface for a random bit stream, wherein the duration of each bit is defined as $T_b$. The power spectrum for a random data sequence, where the bits transition between +A and −A is given by: $P=A^2*T_b*\text{sinc}^2 (f*T_b)$. By selecting $T_b$ so that $f*T_b$ is an integer and f is close to the operating frequency of the wireless network, the interference between the interface 90 and the wireless channel may be minimized. Specifically, power spectrum density is defined as $A^2*T_b*(BW)*\text{sinc}^2 (f*T_b)$. This can then be expressed as $PSD=2A^2*T_b*(BW)\sin^2 (n*f*T_b)/(n*f*T_b)$. $n/T_b$ (which represents the frequency of the serdes clock and its harmonics) can be expressed as $f_{RF}+\Delta$. This can be rewritten as $f_{RF}*T_b=n-\Delta T_b$. Thus, for the bandwidth near the frequency of the radio circuit, referred to as $f_{RF}$, the power spectrum density can be expressed as $PSD=2A^2*Tb*(BW) \sin^2 (\pi(n-\Delta T_b))/(\pi^2*f_{RF}^2*T_b^2)$ or $PSD=2A^2*Tb*(BW) \sin^2 (\pi*\Delta T_b)/(\pi^2*f_{RF}^2*T_b^2)$. At small values, sin(x) is equal to x so this may be expressed as $PSD=2A^2*Tb*(BW)*(\pi*\Delta T_b)^2/(\pi^2*f_{RF}^2*T_b^2)$, which can be simplified to $PSD=2A^2*Tb*(BW)*(\Delta)^2/(f_{RF}^2)$, as shown in FIG. 5. By keeping A small, the power spectrum density at the RF frequencies may be minimized. In this disclosure, a small $\Delta$ is defined as being within 10% of $f_{RF}$. In other words, the frequency of the serdes clock or its harmonics may be selected such that it is within 10% of the frequency of the RF frequency at which the main processing unit transmits and receives.

Further, the present system offers a level of security that is not available using commodity SPI FLASH parts. Specifically, the data that is transmitted over the interface 90 includes a CRC and is also encrypted using a cryptographic algorithm, such as AES-GCM or another algorithm. Thus, not only can the main processing device 10 detects errors in transmission, it can also detect injected bits. Additionally, the external nonvolatile memory device 100 supports secure boot. The external nonvolatile memory device 100 can perform hashing and signature checking onboard and then communicate the result to the main processing device 10 over the secure interface.

This eliminates the need for the contents of the nonvolatile memory to be sent to the main processing device 10 for hashing and validated. This, in turn saves power and reduces the time needed to boot the part.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An external nonvolatile memory device, comprising:
   a rewritable nonvolatile memory, wherein data stored in the rewritable nonvolatile memory is not encrypted;
   an interface, wherein the interface comprises:
      a bidirectional data signal; and
      a clock input, wherein the clock input has a frequency greater than 1 GHz and up to 2.5 GHz, utilizes single-ended CMOS signaling and is used to create a memory serdes clock that is used to clock outgoing data being transmitted on the bidirectional data signal; and
   an encryption/decryption block to encrypt data read from the rewritable nonvolatile memory before the data is transmitted over the interface such that unencrypted data is not exposed outside the external nonvolatile memory device.

2. The external nonvolatile memory device of claim 1, wherein the clock input is multiplied by an integer to create the memory serdes clock.

3. The external nonvolatile memory device of claim 2, wherein the integer is 2.

4. The external nonvolatile memory device of claim 1, wherein the data is transmitted at a rate of greater than 2 Gbits/sec and up to 2.5 Gbits/sec.

5. The external nonvolatile memory device of claim 1, wherein the clock input is held in a deasserted state if no data is being transmitting on the bidirectional data signal.

6. The external nonvolatile memory device of claim 1, wherein the encryption/decryption block utilizes a stream cipher.

7. The external nonvolatile memory device of claim 6, further comprising circuitry to append a cyclic redundancy code (CRC) to the data being transmitted over the interface.

8. The external nonvolatile memory device of claim 1, wherein encryption/decryption block decrypts data received on the interface before writing the data to the rewritable nonvolatile memory.

9. The external nonvolatile memory device of claim 1, wherein the bidirectional data signal utilizes single-ended CMOS signaling.

10. The external nonvolatile memory device of claim 1, wherein the external nonvolatile memory device supports secure boot.

11. A system comprising:
    an external nonvolatile memory device, comprising:
       a rewritable nonvolatile memory; and
       an interface, wherein the interface comprises:
          a bidirectional data signal; and
          a clock input, wherein the clock input has a frequency greater than 1 GHz and up to 2.5 GHZ, utilizes single-ended CMOS signaling and is used to create a memory serdes clock that is used to clock outgoing data being transmitted on the bidirectional data signal; and
    a main processing device, comprising:
       an interface to the external nonvolatile memory device, comprising the bidirectional data signal; and an outgoing clock signal electrically connected to the clock input; and
       a radio circuit, different from the interface to the external nonvolatile memory device, configured to transmit and receive packets at a RF frequency, wherein a frequency of the outgoing clock signal is selected such that the frequency or a harmonic thereof is within 10% of the RF frequency.

12. The external nonvolatile memory device of claim 1, further comprising an interrupt signal, wherein the interrupt signal is asserted when an error is detected by the encryption/decryption block.

13. The external nonvolatile memory device of claim 1, further comprising a processing unit and an interrupt signal, wherein the interrupt signal is asserted when processing unit wishes to provide information to a device connected to the interface.

14. The external nonvolatile memory device of claim 1, further comprising an interrupt signal, wherein if the interrupt signal is asserted by a different device, the external nonvolatile memory device resets.

15. The system of claim 11, wherein the clock input is multiplied by an integer within the external nonvolatile memory device to create the memory serdes clock.

16. The system of claim 15, wherein the integer is 2.

17. The system of claim 11, wherein the data is transmitted at a rate of greater than 2 Gbits/sec and up to 2.5 Gbits/sec.

18. The system of claim 11, wherein the outgoing clock signal is held in a deasserted state if no data is being transmitting on the bidirectional data signal.

19. The system of claim 11, wherein the bidirectional data signal utilizes single-ended CMOS signaling.

20. The system of claim 11, wherein the external nonvolatile memory device supports secure boot.

* * * * *